(12) United States Patent
Gage et al.

(10) Patent No.: US 6,396,115 B1
(45) Date of Patent: May 28, 2002

(54) DETECTOR LAYER FOR AN OPTICS MODULE

(75) Inventors: Edward C. Gage, Apple Valley; Ronald E. Gerber, Richfield; George R. Gray, Apple Valley; Steve C. Dohmeier, Apple Valley; James E. Durnin, Apple Valley; Daniel E. Glumac, Lake Canada, all of MN (US); Tim Gardner, Webster, NY (US); Jill D. Berger, San Jose, CA (US); John H. Jerman, Palo Alto, CA (US); John F. Heanue, San Jose, CA (US); Ghamin A. Al-Jumaily, Columbia Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/316,644

(22) Filed: May 21, 1999

Related U.S. Application Data

(60) Provisional application No. 60/109,272, filed on Nov. 20, 1998, and provisional application No. 60/101,486, filed on Sep. 23, 1998.

(51) Int. Cl.[7] ...................... H01L 31/0232; H01L 31/00
(52) U.S. Cl. ................ 257/432; 257/446; 257/452; 257/449; 257/457; 257/466
(58) Field of Search ................... 257/432, 434, 257/436, 437, 452, 449, 461, 465, 433, 435, 443, 446, 457, 466

(56) References Cited

U.S. PATENT DOCUMENTS

| | | | |
|---|---|---|---|
| 3,969,749 A | | 7/1976 | Bean ........................... 357/49 |
| 5,191,394 A | * | 3/1993 | Saia et al. ..................... 257/52 |
| 5,357,122 A | * | 10/1994 | Okubora et al. ............. 257/432 |
| 5,442,618 A | | 8/1995 | Dewey et al. ............... 369/124 |
| 5,528,071 A | * | 6/1996 | Russell et al. .............. 257/458 |
| 5,586,101 A | | 12/1996 | Gage et al. .................. 369/124 |
| 5,777,975 A | | 7/1998 | Horinouchi et al. ......... 369/112 |

OTHER PUBLICATIONS

Rotich, Smith, Evans, and Brunnschweiler, "Micromachined thin solar cells with a novel light trapping scheme," UK European Micromechanics Conference (1997), 5 pages.
N. Nishi, et al., "Integrated Optical Device–MiniDisc Laser Coupler," Optical Data Storage Conference Paper TuA4 (1998), 4 pages.

* cited by examiner

*Primary Examiner*—Minh Loan Tran
(74) *Attorney, Agent, or Firm*—Simon & Koerner LLP; Nancy R. Simon (57) ABSTRACT

A detector layer for an optics module includes at least one diode having at least one sloped sidewall. At least one isolation region may be formed adjacent to the at least one sloped sidewall to isolate the at least one diode. Conducting material is disposed on at least a portion of the top surface of the diode. An insulating material is disposed on at least a portion of the diode and extends to the conducting material. A metal is disposed on at least a portion of the insulating material and at least a portion of the conducting material such that the metal is coupled to the conducting material.

15 Claims, 5 Drawing Sheets

| Coating | $R_S$ | $R_P$ | Incident | Exiting | Angle | Design | #Layers | Total Thickness |
|---|---|---|---|---|---|---|---|---|
| AR1 | <0.4% | <0.4% | Air | Silica | 38°±3° | V-coat | 2 | 236nm |
| AR2 | <0.5% | <0.5% | Quartz | Silicon | 37°±0.5° | V-coat | 2 | 237nm |
| PBS1 | >98% | <2% | Silica | Air | 40°±1.5° | Edge filter | 21 | 1757nm |
| PBS2 | >98% | <2% | Quartz | Silicon | 37°±1.5° | Edge filter | 21 | 1786nm |
| HR | >99% | — | Quartz | Silica | 37°±3° | Enhanced Al | 4 + Al | 690nm + 1000nm Al |
| *LBS | 80±3% | <6% | Silica | Quartz | 40°±1° | Asymmetric edge filter | 19 | 1564nm |

*Phase shift on reflection (difference between S and P)=0°±8° from 650–670nm.

DETECTOR LAYER FOR AN OPTICS MODULE

REFERENCE TO RELATED APPLICATION

This application claims the benefit of U.S. Provisional Applications Nos. 60/109,272 filed Nov. 20, 1998 and 60/101,486 filed Sep. 23, 1998.

FIELD OF THE INVENTION

This invention relates to the field of optical storage systems and, more specifically, to a detection module used in optical storage systems.

BACKGROUND

Magneto-optical (MO) storage systems provide storage of data on rotating disks. The disks are coated with a magneto-optical material and divided into magnetic areas referred to as domains. The data is stored in the magneto-optical material as spatial variations in the magnetic domains.

In one type of MO storage system, a MO head is located on an actuator arm that moves the head along a radial direction of the disk. As the disk rotates, the head can be positioned over a particular domain. A magnetic coil on the head creates a magnetic field oriented perpendicular (i.e., vertical) to the disk's surface. Each vertically magnetized domain represents either a zero or one depending on the direction that the magnetic field is pointing.

The vertical magnetization is recorded in the MO material by focusing a beam of laser light to form an optical spot on a disk domain. The laser beam heats the MO material at the spot to a temperature near or above the Curie point. The Curie point is the temperature at which the magnetization in the material may be readily altered with an applied magnetic field. A current is then passed through the magnetic coil to orient the vertical magnetization in either the up or down direction indicating a one or zero. This orientation occurs only in the region of the optical spot where the temperature is sufficiently high, and remains after the laser beam is removed.

Information is read from a particular domain using a less powerful laser beam, making use of the Kerr effect, to detect a rotation of polarization of a beam reflected off the disk's surface. The magnetization of each domain causes a rotation of the optical polarization of the laser beam incident at the domain. The polarization of the reflected beam is rotated in a direction, clockwise or counter-clockwise, determined by the orientation of the domain's vertical magnetization. Measurement of the direction of rotation is performed by an optical detection system that converts the optical signals into electrical signals.

One particular MO storage system uses a radio frequency modulated Fabry-Perot laser source coupled to a single optical fiber to transmit the laser beam to the storage system's head. The optical fiber directs an incident laser beam to the head, which is then directed toward the rotating disk. The head also directs the reflected laser beam from the rotating disk to the same optical fiber. Discrete optical components are located remotely from the head for optically processing the rotated polarization components of the reflected laser beam. This system relies on the preservation of the polarization states of the reflected beam through the entire optical path. As such, a polarization maintaining optical fiber is used in the system. However, the birefringent nature of a polarization maintaining fiber combined with certain characteristics of the laser diode causes some undesirable results.

Birefringence is a characteristic of an optical material in which the index of refraction depends on the direction of polarization of light propagating in the material. Birefringence in the fiber material causes a phase shift between the orthogonally polarized light beams that are transmitted along the fiber. In addition, the use of a radio frequency modulated Fabry-Perot laser diode produces a relatively broad-spectrum, multi-wavelength incident light beam having wavelengths that fluctuate with time.

One problem with using a single optical fiber system is that noise, associated with the FP laser, is transmitted by the optical fiber to the discrete optical processing components located remotely from the head. Because of the birefringent characteristic of the optical fiber, the multiple fluctuating wavelengths of the incident light from the laser diode cause signal components in the reflected beam to have polarization states that also fluctuate. The competition between the multiple fluctuating wavelengths of the reflected beam appears as noise at the storage system's detectors. This noise may limit the achievable data rate at a given signal level. Furthermore, optical fibers exhibit polarization mode leakage that may cause one polarization mode to appear as another. This polarization leakage also appears as noise at the storage system's detectors.

Another problem with the single fiber optical system is that the use of optical processing components located remotely from the head require tight alignment tolerances between the discrete components. Such tight alignment tolerances cause the manufacturing of the system to be more difficult.

Figure 1:
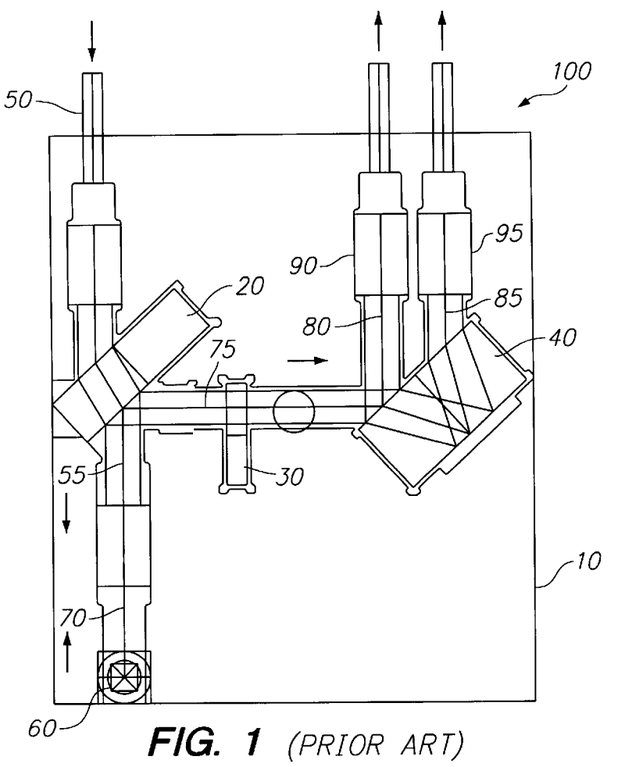
FIG. 1 illustrates a prior art MO storage system.

FIG. 1 illustrates another MO storage system 100 that uses multiple optical fibers and discrete optical components on a head. A single optical fiber is used to direct incident light and two optical fibers are used in the return path to direct reflected light. In system 100, discrete optical processing components are placed directly on the head 10 in a particular relationship to each other in order to direct the incident light beam onto the disk and to convert the polarization information from a magnetized domain into two separate reflected light beams having differential intensity information. The discrete optical components may include a leaky beam splitter 20, a phase plate 30, and a polarizing beam splitter (or other polarization splitting element such as a Wollaston prism) 40.

Linearly polarized light 50 is directed through leaky beam splitter 20 and then to the disk (not shown) by a mirror 60. The return beam 70 is directed back to leaky beam splitter 20 with a Kerr rotation as discussed above. The linearly polarized light, in system 100, is characterized by two plane-polarized beams: one beam with its electric field parallel to the plane of incidence (horizontal or p-polarized) and the other beam with its electric field perpendicular to the plane of incidence (vertical or s-polarized). The leaky beam splitter 20 reflects the return light beam 75 to phase plate 30. Phase plate 30 introduces a phase shift between the p-polarized and s-polarized components of light 75. The phase plate 30 rotates the polarization such that equal components of p-polarized and s-polarized light are received by polarizing beam splitter 40 when a Kerr rotation is not present on the disk. When a Kerr rotation is present on the disk, however, phase plate 30 rotates the polarization such that different components of p-polarized and s-polarized light are received by polarizing beam splitter 40. The light passing through the phase plate 30 is directed to the polarizing beam splitter 40.

The polarizing beam splitter 40 includes a glass plate having a multi-layer coating on its front surface that acts to separate the s-polarized and p-polarized components into spatially separate beams. The coating on the front surface of polarizing beam splitter 40 reflects light based on its polarization such that all of the s-polarized light 80 is reflected and all of the p-polarized light 85 is transmitted. The s-polarized light 80 is reflected to a lens 90 that focuses it into a multimode fiber which carries the light to a detector (not shown). The p-polarized light 85 is refracted to the back surface of polarizing beam splitter 40. The back surface of polarizing beam splitter 40 acts as a mirror to reflect the p-polarized light 85 such that it is offset from the s-polarized light 80. The p-polarized light 85 is transmitted to a second lens 95 that focuses it into a second multimode fiber which carries the light to a different detector. The detectors convert the light amplitude signals from each channel into electrical signals.

Once the electrical signals are produced, a difference signal between the s-polarized and p-polarized light is calculated. The difference signal is used to determine the sign of the Kerr rotation indicating the direction of the magnetic domain. When equal s-polarized and p-polarized components are received, the detectors would generate identical signals and, thus, the differential signal would be zero. If unequal components of light are received, the detectors would generate a negative or positive signal depending on the Kerr rotation direction of the reflected light.

The MO storage system's head has various channels and recesses that are dimensioned and positioned to hold the discrete optical components in a particular relationship to each other in order to direct the light beams as described above. This system reduces sensitivity to laser mode competition and polarization leakage by analyzing the polarization state of the reflected beam on the head instead of returning the reflected beam through the input polarization maintaining fiber for analysis.

One problem with such a system, however, is the need to separately fabricate, cut, and align each of the discrete optical components mounted on the head. This may significantly increase the cost and assembly time of the head. Another problem with such a system is the larger size of the head due to the space required for each of the discrete optical components and the return path optical fibers placed on the head. The size of a head limits the spacing that can be achieved between MO disks in a storage system. The size and mass of the head also limits tracking bandwidth, track density, and the speed at which data can be accessed from the MO disk.

SUMMARY OF THE INVENTION

The present invention pertains to an optics module having a birefringent crystal. A first plurality of segmented optical coatings may be integrated with the birefringent crystal to optically process a first light through a path in the birefringent crystal. The first plurality of segmented optical coatings may be integrated with the birefringent crystal based on the path.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An intended advantage of the embodiments disclosed herein is to reduce the size, cost, and complexity of producing optical processing and detection elements by integrating discrete optical components into an optics module that uses particular angles of incidence and segmented optical coatings in replace of discrete optical components.

In the following description, numerous specific details are set forth such as examples of specific materials, process steps, process parameters, dimensions, etc. in order to provide a thorough understanding of the present invention. It will be obvious, however, to one skilled in the art that these specific details need not be employed to practice the present invention. In other instances, well known materials or methods have not been described in detail in order to avoid unnecessarily obscuring the present invention.

Figure 2:
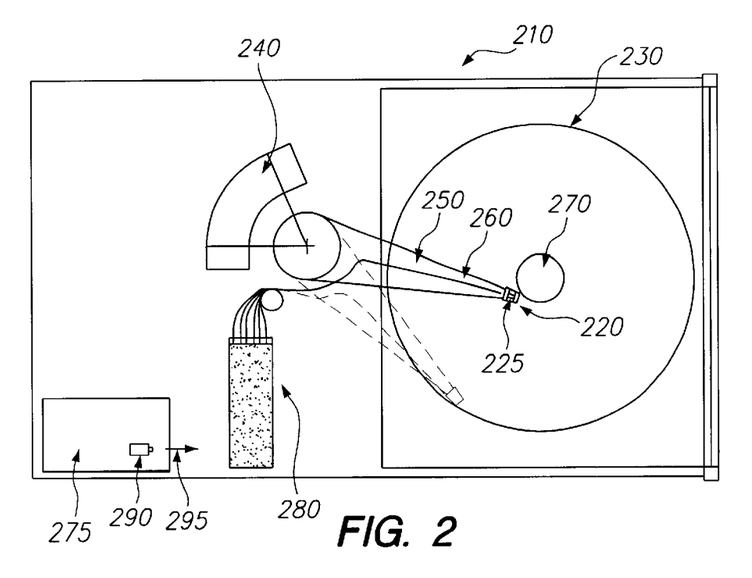
FIG. 2 illustrates a MO storage system having an optics module in accordance with one embodiment of the present invention.

FIG. 2 illustrates a MO storage system 210 having an optics module in accordance with one embodiment of the present invention. The MO storage system 210 includes a set of MO heads (one head 220 having an optics module 225 is shown), a set of disks (one disk 230 is shown), a rotary actuator magnet and coil assembly 240, an actuator arm 250, an optical fiber 260, a spindle motor 270, a laser optics assembly 275, and an optical switch 280.

A laser diode 290 on a laser optics assembly 275 generates an incident laser beam 295. In one embodiment, laser diode 290 is a radio frequency (RF) modulated Fabry-Perot (FP) laser diode operated at a power of approximately 30–40 milli-Watts (mW) with a wavelength of approximately 660 nanometers (nm), an RF amplitude modulation in the range of approximately 300–400 MHz, and an unmodulated spectral bandwidth of approximately +/−1 nm.

Optical switch 280 selectively couples incident laser beam 295 to an optical fiber 260 corresponding to a selected head 220 out of the set of heads. The laser beam is routed through optics module 225 and focused to a spot on disk 230. Head 220 is positioned over a particular domain on the disk using spindle motor 270 to rotate disk 230 and rotary actuator magnet and coil assembly 240 to move actuator arm 250, having head 220, radially across disk 230. The laser beam is used to write and read data from disk 230 as discussed herein. In other embodiments, however, other techniques for directing light and head positioning may be used. In another embodiment, for example, the rotary assembly is replaced with a linear assembly to move head 220 across disk 230.

Figure 3A:
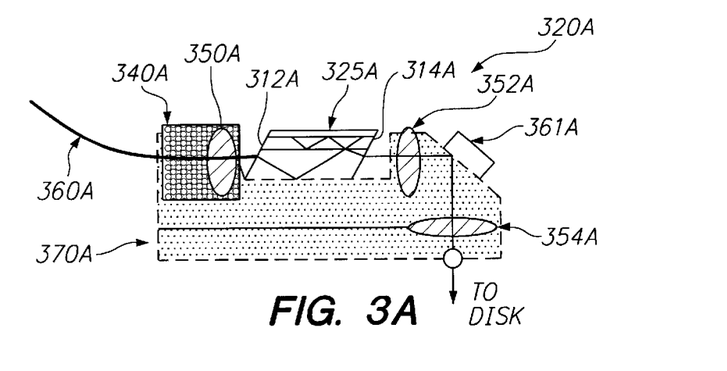
FIG. 3A illustrates a side view of a head having an optics module according to one embodiment of the present invention.

FIG. 3A illustrates a side view of a head 320A having an optics module according to one embodiment of the present invention. Head 320A includes an optical fiber 360A connected to a beam collimating assembly 430A mounted on a slider body 370A. Beam collimating assembly 340A may be used to simplify alignment into head 320A where optical fiber 360A is coupled to a lens 350A inside assembly 340A. Lens 350A has an optical axis coaxial with the end of optical fiber 360A and collimates the incident linearly polarized light from optical fiber 360A. Lens 350A directs the collimated incident light onto an input side 312A of optics module 325A. In the illustrated embodiment, the plane of the incident light propagation is perpendicular to the surface of the disk (not shown). The light is propagated along a path inside optics module 325A as is discussed in further detail below. The incident light exiting the output side 314A of optics module 325A is transmitted to a mirror 361A through imaging lens 352A. Mirror 361A is aligned to direct the incident light from optics module 325A to the disk and to direct reflected light from the disk to optics module 325A. Objective lens 354A is used to focus the incident light from mirror 361A within a particular spot on the disk. In one embodiment, lenses 350A, 352A, and 354A are gradient index (GRIN) lenses. In other embodiments, lenses 350A, 352A, and 354A are constructed from other materials, for example, molded plastic.

In an alternative embodiment, glass sheets (not shown) are coupled to the input side 312A and output side 314A. Optical fiber 360A is coupled to the glass sheet on input side 312A and lens 352A is coupled to the glass sheet on output side 314A. In one embodiment, an index matching glue is used to couple the glass sheets to the optics module.

The optics module, however, is not only limited to the head configuration illustrated in FIG. 3A. In other embodiments, the optics module may be mounted for use with other head configurations as shown, for example, in FIG. 3B.

Figure 3B:
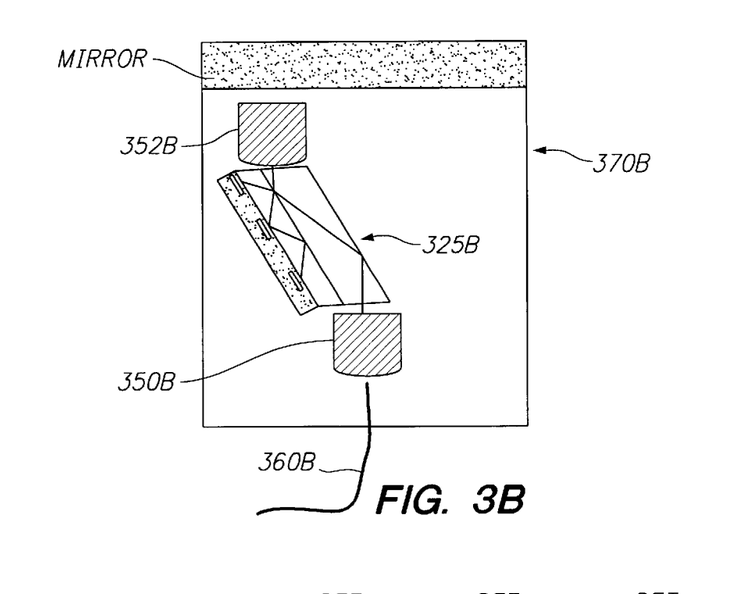
FIG. 3B illustrates a top view of a head having an optics module according to another embodiment of the present invention.

FIG. 3B illustrates a top view of a head having an optics module according to an alternative embodiment of the present invention. In the illustrated embodiment, the plane of the incident light propagation is parallel to the surface of the disk (not shown). Thus, optics module 325B is turned 90 degrees in relation to optics module 325 of FIG. 3A before mounting onto slider body 370B. However, this orientation does not effect the propagation of the light inside the optics module. In this configuration, optics module 325B may be shifted off center of the head 370B to allow the optical fiber 360B to remain mounted along a center axis of the head for better head flying stability. Lenses 350B and 352B are mounted accordingly to cooperate with the off center optics module 325B and the center mounted fiber 360B.

In alternative embodiments, lenses 350A and 352A of FIG. 3A, and 350B and 352B of FIG. 3B are not used. Instead, the optical coatings discussed below are designed to function over a range of incidence angles of light on the optics module coming from the optical fiber and the mirror.

Figure 4:
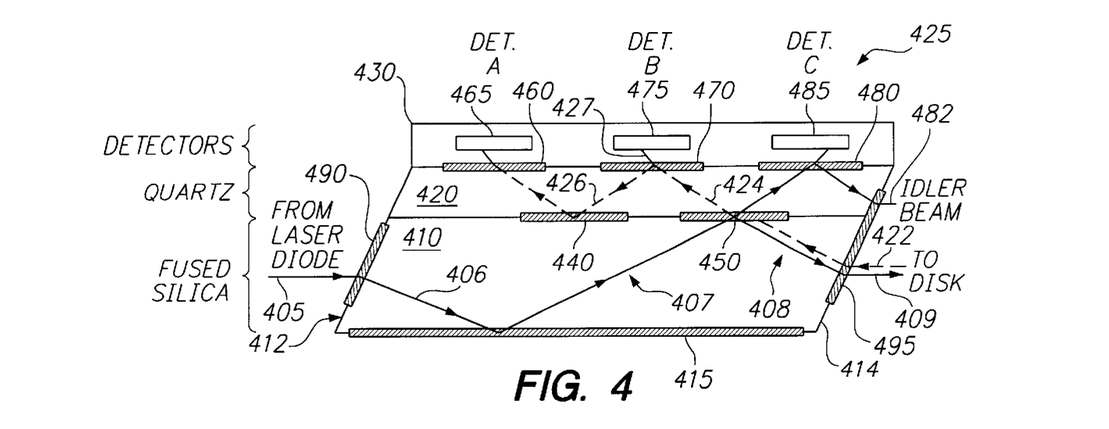
FIG. 4 illustrates an optics module according to one embodiment of the present invention.

FIG. 4 illustrates an optics module according to one embodiment of the present invention. The optics module 425 includes a carrier crystal 410, a birefringent crystal 420 coupled to carrier crystal 410, and a detector layer 430 coupled to birefringent crystal 420. Carrier crystal 410 is constructed from an optically transmissive material. In one embodiment, carrier crystal 410 is constructed from fused silica. In other embodiments, carrier crystal 410 is constructed from other optically transmissive materials. Birefringent crystal 420 is constructed from a birefringent, optically transmissive material. In one embodiment, birefringent crystal 420 is constructed from quartz. In other embodiments, birefringent crystal 420 is constructed from other birefringent materials. Detector layer 430 is constructed from a semiconductor material. In one embodiment, detector layer 430 is constructed from silicon. In other embodiments, detector layer 430 is constructed from other semiconductor materials.

The carrier crystal 410 has a polarizing beam splitter (PBS) coating 415 on a side opposite to the side coupled to birefringent crystal 420. A high reflection (HR) coating 440 and a leaky beam splitter (LBS) coating 450 are disposed between carrier crystal 410 and birefringent crystal 420. Two segments of an anti-reflection (AR) coating 460 and 480, and a second PBS coating 470 are disposed between birefringent crystal 420 and detector layer 430. Carrier crystal 410 has an AR coating 490 and an AR coating 495 on its input side 412 and output side 414, respectively. For embodiments where an idler beam is not used, AR coating 495 does not extend over the birefringent crystal 420 as is illustrated in FIG. 4. It should be noted that the fabrication of the coating materials are well known in the art and, therefore, the details are not described herein.

In one embodiment, input and output sides 412, 414 are parallel to each other. In alternative embodiment, the sides may be cut at different angles to shape the light beam (e.g., circular or elliptical). The light beam 405 originating from the laser diode 90 of FIG. 2, for example, may be elliptical. A circular beam, however, may be required to focus the light beam to a spot on the disk or to couple the light beam to a fiber. The light may be passed through an anamorphic prism (not shown) so that elliptical light entering the prism exits as circular light. The angles that input side 412 and output side 414 are cut may be used to replace the function of this beam shaping prism.

In one embodiment, light beam 405, originates from a laser diode generating primarily s-polarized light and is incident on the input side 412 of crystal 410 having an AR coating 490. Light beam 405, however, may have a p-polarized component due to a rotation created by transmission through the optical fiber. Light beam 405 has its polarization axis oriented such that the s-polarized component is out of the page.

It should be noted that while FIG. 4 illustrates the incident beam parallel to the plane of carrier crystal 410 (i.e., parallel to the surface having PBS coating 415), light beam 405 can be incident at other angles of incidence. The angle of incidence for light beam 405 may be chosen to maximize the resulting angle of incidence of light beam 406 on PBS coating 415 in order to maximize the separation of the s-polarized and p-polarized wavelengths of light beam 406. A larger separation of these wavelengths relaxes the fabrication tolerances required for PBS coating 415. However, the angle of incidence of light beam 406 on PBS coating 415 should not result in total internal reflection. It should also be noted that in alternative embodiments, the module can be designed for use with a primarily p-polarized laser beam by selecting PBS and LBS coatings with appropriate specifications.

When light beam 405 is incident on AR coating 490, some of the light will be reflected at the outer surface of the coating and some of the light will be reflected at the surface of the input side 412 of crystal 410. The remainder of the light is transmitted. AR coating 490 acts to cancel out the reflections from the outer surface of the coating and the surface of input side 412 by destructive interference. Based on the principle of conservation of energy, all the canceled out reflections will appear as enhanced intensity in transmitted light 406.

In one embodiment, AR coating 490 is made of a single film layer. In a single layer coating, however, the refractive index of the coating material may be too high, possibly resulting in too strong a reflection from the outer surface of the material which may not be completely canceled by interference of the weaker reflection from the inner surface on input side 412 of the crystal. In other embodiments, AR coating 490 is made of a multi layer film so that the strong reflection at the outer surface may be canceled by interference with multiple weaker reflections at the inner layer surfaces.

The transmitted light beam 406 from AR coating 490 is refracted toward the surface of crystal 410 having a PBS coating 415 to filter out any p-polarized component in light beam 406. For example, PBS coating 415 may filter out noise generated by either the laser diode or the optical fiber. PBS coating 415 acts to separate the polarized components of light beam 406 such that only the s-polarized component is reflected (light beam 407), and the p-polarized component is transmitted out of crystal 410 (not shown) through PBS coating 415. In an alternative embodiment, carrier crystal 410 having PBS coating 415 is not used. Instead, light beam 405 is incident directly on LBS coating 450 which acts to filter out the p-polarized component of light beam 405.

The s-polarized light beam 407 is reflected off PBS coating 415 towards an interface area of carrier crystal 410 and birefringent crystal 420 having LBS coating 450. In an alternative embodiment, carrier crystal 410 is replaced with a discrete PBS component to direct light beam 405 to LBS coating 450 on birefringent crystal 420. LBS coating 450 acts to reflect a portion of the incident light and transmit a smaller portion of the incident light through the coating material. In one embodiment, LBS coating 450 reflects approximately 80% of the s-polarized light out of crystal 410 towards the disk and transmits the remaining 20% of the s-polarized light through birefringent crystal 420 towards C detector 485. In one embodiment, C detector 485 is a front facet detector that can be used to monitor laser power reaching the disk based on the amount of light reaching C detector 485.

In another embodiment, C detector 485 may also be used to verify closure of optical switch 280 of FIG. 2. In yet another embodiment, a portion of the light directed towards C detector 485 may be reflected off the C detector 485 surface and made to exit optics module 425 to be used as an idler beam 482. The idler beam 482 may be used for switching or for tracking motor detection in embodiments where optics module 425 is located remotely from the head. Idler beam 482 is not necessary in embodiments where optics module 425 is mounted on a head as illustrated in FIG. 2.

The light beam 409 exits optics module 425 through the output side 414 of crystal 410 having AR coating 495. AR coating 495 is similar to AR coating 490 described above. The exiting light beam 409 is then directed toward the surface of the disk (not shown).

A reflected beam 422 is returned from the disk along approximately the same path as exiting beam 409. Reflected beam 422 is incident on AR coating 495 and is refracted through carrier crystal 410 towards LBS coating 450. Approximately 100% of the p-polarized component of reflected beam 422 is transmitted by LBS coating 450. In addition, approximately 20% of the s-polarized component is transmitted along with the p-polarized component in order to enable MO signal detection. LBS coating 450 acts to minimize the phase shifts between the s-polarized and p-polarized components of reflected beam 422 in order to maximize the MO signal. The light beam 424 passing through LBS coating 450 is refracted through birefringent crystal 420 toward PBS coating 470. The birefringent crystal 420 functions to equalize the intensity of and further minimize the phase shift between the s-polarized and p-polarized components of light beam 424. In one embodiment, birefringent crystal 420 is a half-wave plate that rotates the plane of polarization by 45 degrees. In other embodiments, birefringent crystal 420 is a phase plate that rotates the plane of polarization by other degrees based on the particular coating specifications used in the optics module.

The PBS coating 470 acts to separate the polarized components of light beam 424. The p-polarized component 427 is transmitted to B detector 475 in detector layer 430 and the s-polarized component 426 is reflected through birefringent crystal 420 to HR coating 440.

In an alternative embodiment, HR coating 440 is replaced with an air and crystal boundary segment where light 426 is caused to be incident on that boundary segment at an angle resulting in total internal reflection of light 426.

Light beam 426 is then reflected off HR coating 440 toward AR coating 460. AR coating 460 transmits light beam 426 to A detector 465. AR coating 460 is constructed similar to the embodiments described above for AR coating 490. In an alternative embodiment, the detector layer 430 is separate from the optics module and aligned on the head to receive the light from AR coatings 460 and 470. After receiving the optical signals, the detectors convert the optical signals into electrical signals. The MO signal is generated by calculating the difference between the polarization components received at A and B detectors 465 and 475, respectively.

In one embodiment, the optical signals received at A detector 465 and B detector 475 can be combined to generate a read only memory (ROM) signal. These signals can be used to read disk positioning information (e.g., servo data marks) encoded in the disks. The reflected light beam will have a higher intensity when the incident light beam is centered on a mark and a lower intensity when the light beam is not centered on a mark. Any changes in intensity received at A and B detectors 465 and 475, respectively, can be used to adjust the positioning of the light beam coming from the head.

Figure 5A:
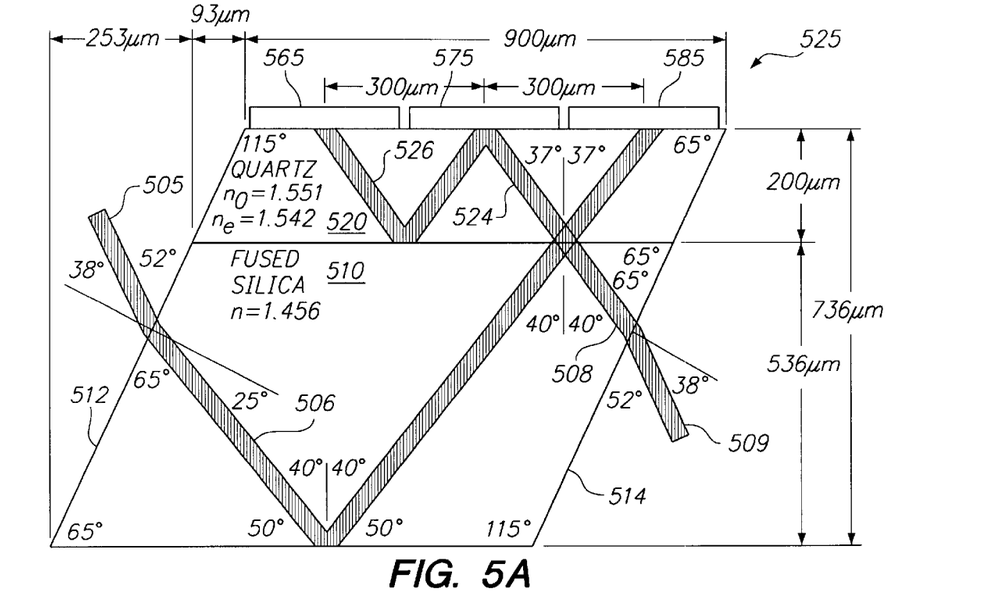
FIG. 5A illustrates material dimensions and properties according to one embodiment of the optics module.

FIG. 5A illustrates material dimensions and properties according to one embodiment of the optics module. Carrier crystal 510 is fused silica with an index of refraction of 1.456 and a height of approximately 536 microns (um). The quartz material of birefringent crystal 520 divides an entering unpolarized light beam into two components referred to as an ordinary ray and an extraordinary ray. Birefringent crystal 520 has an index of refraction for the ordinary ray ($n_o$) of 1.551 and an index of refraction for the extraordinary ray ($n_e$) of 1.542. The height of birefringent crystal 520 is approximately 200 um. Carrier and birefringent crystal 510 and 520 have a length of approximately 900 um and are cut at approximately a 65 degree angle with respect to their bottom surfaces. The width of optics module 525 (i.e., into the page) is not a critical dimension.

The incidence angle of light beam 505 is approximately 38 degrees, resulting in an angle of incidence of approximately 40 degrees on the surface of optics module 525 having PBS coating 415 of FIG. 4. Based on the physical laws of reflection, the exiting angle of light beam 509 will be the same as the angle of incidence of light beam 505. The return light beam will travel along approximately the same path as exiting light beam 509 and be refracted in birefringent crystal 520 at approximately a 37 degree angle. The center of the detector 575 is spaced approximately 300 um apart from the centers of detectors 565 and 585. Assuming the light beam remains collimated during its propagation through optics module 525, the diameter of the return beams on the detectors may be approximately 1.5 times the diameter of light beam 505.

Figure 5B:
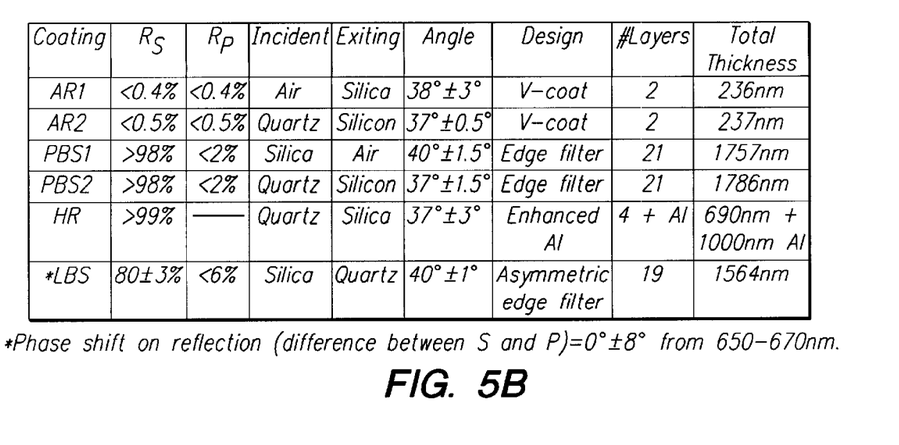
FIG. 5B illustrates optical coating specifications for one embodiment of the present invention.

It should be noted that the coatings may be allowed to contact each other or may be separated, as illustrated in FIG. 4, as long as the coatings cover the regions of light propagation through the optics module. The specifications for one embodiment of the above described coatings are shown in FIG. 5B where the wavelength range for all the listed coatings is 660 nm +/−10 nm. The listed coatings may be ordered to specification from industry manufacturers, for example, Toyo Communications Equipment Co., LTD or Melles Griot, Inc. It should be noted that the coating specifications in FIG. 5B are merely illustrative and that the coating specifications may be varied for use with light in other wavelength ranges.

Figure 6:
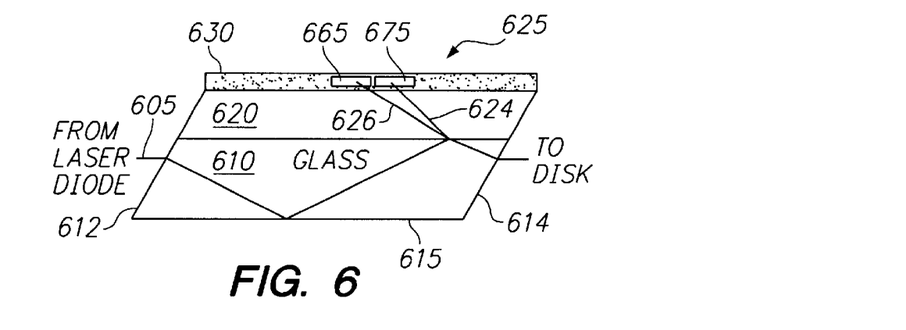
FIG. 6 illustrates an optics module according to an alternative embodiment of the present invention.

FIG. 6 illustrates an optics module according to an alternative embodiment of the present invention. Optics module 625 includes a carrier crystal 610, a birefringent crystal 620 coupled to carrier crystal 610, and a detector layer 630 coupled to birefringent crystal 620. In one embodiment, birefringent crystal 620 is beta barium borate (BBO) with its optic axis oriented in a plane perpendicular to the propagation direction of light beam 605 at 45 degrees with respect to the plane of incidence. In other embodiments, birefringent crystal 620 is constructed from other birefringent materials, for example, lithium niobate. The birefringent character of birefringent crystal 620 replaces the function of PBS coating 470 of FIG. 4 by splitting the s-polarized component 626 and p-polarized component 624 of the return beam towards detectors 665 and 675, respectively.

Figure 7A:
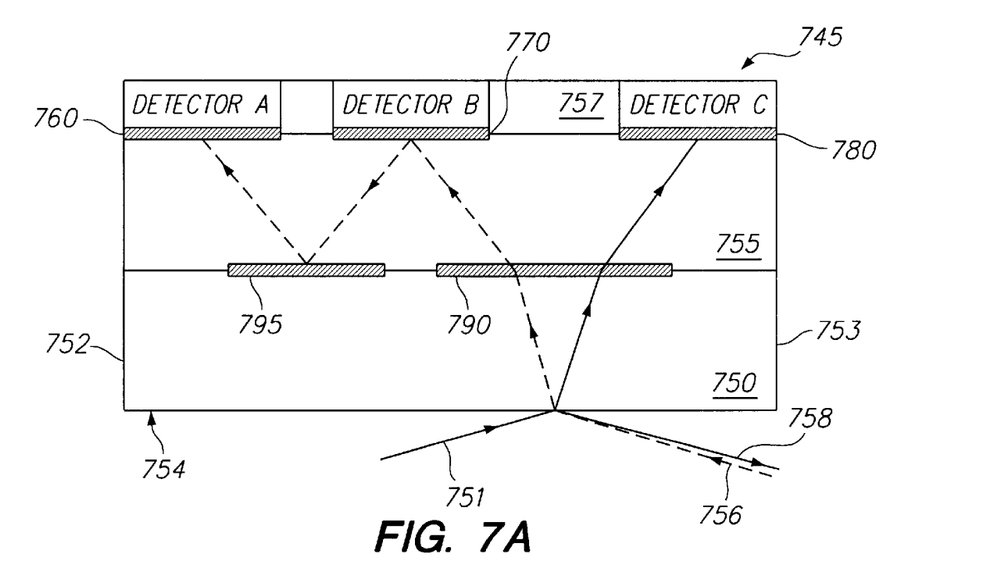
FIG. 7A illustrates an optics module according to yet another embodiment of the present invention.

FIG. 7A illustrates an optics module according to another embodiment of the present invention. The optics module 745 includes a carrier crystal 750, a birefringent crystal 755 coupled to carrier crystal 750, and a detector layer 757 coupled to birefringent crystal 755. Detector layer 757 is similar to the detector layers in the embodiments described above. Birefringent crystal 755 is similar to the birefringent crystal in the embodiments described above. A HR coating 795 is disposed on a segment between carrier crystal 750 and birefringent crystal 755. A PBS coating 770 is disposed on a segment between birefringent crystal 755 and detector layer 757.

Carrier crystal 750 is constructed from an optical material with a high refractive index. In one embodiment, carrier crystal 750 is a crystalline glass material having an index of refraction greater than 3.0, for example, gallium phosphide (GaP). GaP has an index of refraction of 3.281 for 660 nm wavelength light. In another embodiment, a glass material with an index of refraction less than 3.0 is used, for example, silicon nitride or saphire.

Light beam 751, originating from a laser diode generating primarily s-polarized light, is incident on an uncoated bottom surface 754 of the carrier crystal 750, rather than on a side surface 752. The light beam 751 is incident at Brewster's angle. Brewster's angle is the angle of incident light at which any p-polarized component of incident light is absent in reflected light for a particular refractive index crystal. The uncoated bottom surface 754 of the carrier crystal having a high index of refraction, with a Brewster's angle for the incident light beam 751, functions as a polarizing beam splitter to filter out any p-polarized component in light beam 751 generated by either the laser diode or the optical fiber. The bottom surface 754 also functions as a leaky beam splitter to correct for phase shift between s-polarized and p-polarized components of the return light beam 756.

At Brewster's angle, a portion of s-polarized component of light beam 751 is reflected for transmission to the disk and smaller portion of the s-polarized component of light beam 751 is refracted through the carrier crystal. In one embodiment, the Brewster's angle used will reflect approximately 80% of the s-polarized light with the remaining 20% of the s-polarized light refracted through carrier crystal 750 toward AR coating 790 (to be transmitted to the detector layer). A portion of the light beam 758 returned from the disk is similarly refracted through carrier crystal 750 towards AR coating 790 and transmitted to birefringent crystal 755 having additional segmented optical coatings. AR coatings 790, 760, and 780 are similar to AR coating 490 of FIG. 4 described above. HR coating 795 and PBS coating 770 are similar to HR coating 440 and PBS coating 470, respectively, of FIG. 4 described above.

The functions of LBS coating 450 and PBS coating 415 of FIG. 4 are performed by a reflection at Brewster's angle off the uncoated high refractive index carrier crystal 750 in optics module 745. The elimination of these multi film optical coatings may reduce the manufacturing time and cost of the optics module. Furthermore, optics module 745 is less sensitive to changes in the wavelength and incident angle of light. Whereas the LBS coating 450 of FIG. 4 minimizes the phase shift between the s-polarized and p-polarized components to approximately +/−8 degrees over the required wavelength, the phase shift for the carrier crystal 750 is virtually zero for all incident angles and wavelengths. In addition, the need to precisely cut, polish, or anti reflection coat the sides 752 and 753 of the optics module is eliminated because light enters only from bottom surface 754.

A high refractive index crystal, however, may not be able to be used in MO storage systems that use a lower wavelength of light. For example, GaP is not transparent to wavelengths of light below approximately 550 nm. The optics module 425 of FIG. 4 using a coating to perform the leaky beam splitter function may still be used with lower wavelengths of light by modifying the specifications of the coating material for use with a desired wavelength.

Figure 7B:
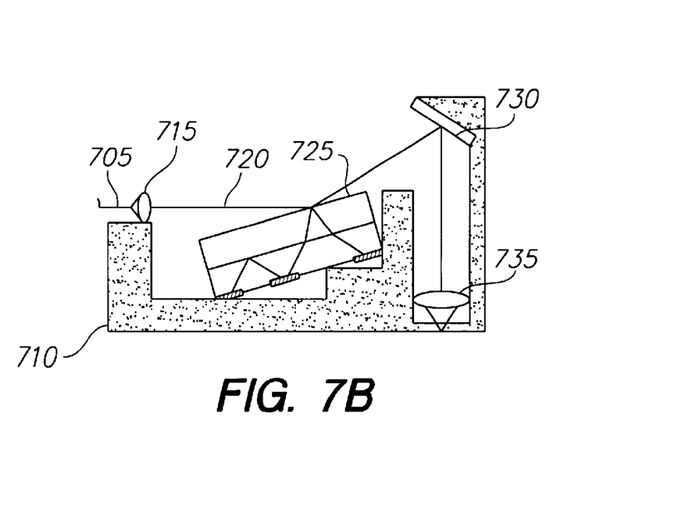
FIG. 7B illustrates a head having an optics module according to yet another embodiment of the present invention.

FIG. 7B illustrates a head having an optics module in accordance with another embodiment of the present invention. The optics module 725 is similar to optics module 745 of FIG. 7A. Light beam 720 emerging from optical fiber 705 is collimated by a GRIN lens 715. Optics module 725 is positioned on slider body 710 so that light beam 720 is incident on the optics module 725 at Brewster's angle. In one embodiment, optics module 725 is glued to slider body 710. In another embodiment, optics module 725 is coupled to slider body 710 with micro springs (not shown). It should be noted that other methods for attaching the optics module 725 to slider body 710 may be used.

A portion of light beam 720 enters optics module 725 with the remainder reflected off the mirror 730 and focused by objective lens 735 onto a disk (not shown). A return light from the disk is passed through objective lens 735 and reflected off mirror 730 to optics module 725 for processing into a MO and a ROM signal. In an alternative embodiment, light beam 720 is not passed through GRIN lens 715. Elimination of GRIN lens 715 may be possible because of the improved performance of optics module 745 of FIG. 7A over a large range of incident angles.

The optics module described in the above embodiments integrates discrete optical components into a single module by replacing discrete optical components with segmented optical coatings and by orienting the optics module so that entering light has a particular angle of incidence. By integrating some discrete components in an optics module using optical coatings, the complexity of aligning those discrete components on a head (or off head assembly) to cooperate with each other and the size of the head are reduced.

In one embodiment, the optics module is manufactured using semiconductor wafer fabrication techniques to apply segmented optical coatings to cover the path of light propagation in the resulting optics modules. Wafer coating techniques are well known in the art and, thus, the details are not described herein. It should be noted that the coatings may be applied in different orders and to different material layers than discussed below.

Referring again to FIG. 4, a wafer of birefringent material is selected for birefringent crystal 420. In one embodiment, the wafer of birefringent material is cut so that birefringent crystal 420 acts as a half wave plate with its optic axis lying perpendicular to the direction of light propagation and oriented at 22.5 degrees to the plane of incidence at the surface of the LBS. In alternative embodiments, birefringent crystal 420 is oriented at other angles relative to the plane of incidence and based upon the particular selection and placement of coatings. PBS coating 415 is applied to a segment of one side of birefringent crystal 420 corresponding to the area of B detector that will be contacted by light beam 424. AR coating segments 460 and 480 are applied adjacent to PBS coating 415 corresponding with A detector 465 and C detectors 485, respectively. In an alternative embodiment, AR coating segments 460 and 480, and PBS coating 470 are applied to the detector layer rather than the birefringent wafer.

HR coating 440 is applied to birefringent crystal 420, on the side opposite to PBS coating 415, to a segment that will receive light beam 426 and reflect it to AR coating segment 460. The wafer of birefringent material is then ready to be coupled to a detector wafer so that the segmented coatings are aligned with individual detectors.

A wafer of crystalline material is selected for carrier crystal 410. LBS coating 450 is applied to a segment of carrier crystal 410 aligned to cover an area that light beam 407 and return beam 422 will be incident on. In an alternative embodiment, LBS coating 450 is applied to a segment of birefringent crystal 420 adjacent to HR coating 440. A PBS coating 415 is applied to the side of carrier crystal 410 opposite the side with LBS coating 450. Carrier crystal 410 is then ready to be coupled to birefringent crystal 420.

Figure 8:
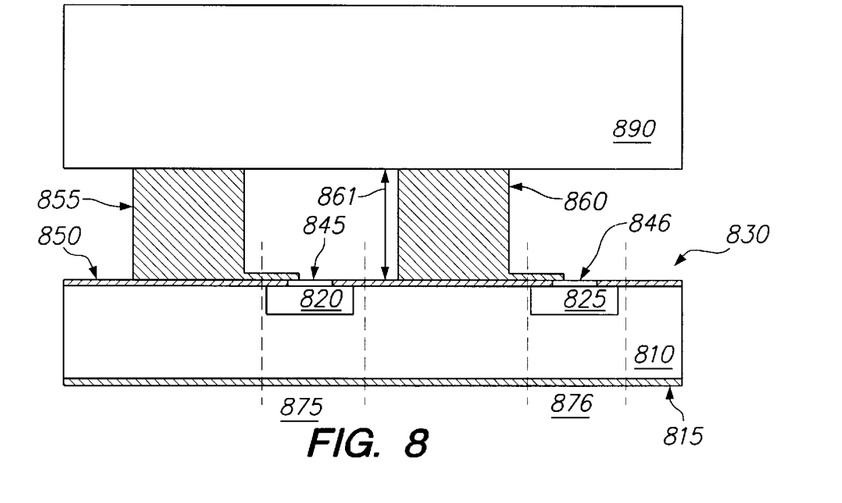
FIG. 8 illustrates a cross section of a detector layer according to one embodiment of the present invention.

A semiconductor wafer having detectors that receive optical signals from the birefringent crystal is fabricated. FIG. 8 illustrates a cross section of a detector layer according to one embodiment of the present invention. It should be noted that photolithography and doping techniques are well known in the art and, thus, the details are not described herein.

A cross-section of two photodiode detectors 875 and 876 in detector layer 830 is shown in FIG. 8. The detectors 875 and 876 are photodiodes that are metal-p-n junctions operated under reverse bias. When an optical signal impinges on the photodiodes, the depletion region serves to separate photo-generated electron-hole pairs such that an electric current will flow in a circuit connected to the photodiodes.

A p-type ohmic contact 815 is placed on one side of p-type semiconductor material 810 for electrical connection. The semiconductor material 810 is doped, on a side opposite to that having ohmic contact 815, to form n-type regions 820 and 825. Regions 820 and 825 may be doped using diffusion or implantation techniques that are well known in the art.

Diode contacts 845 and 846 are placed on top of regions 820 and 825, respectively, using photolithography techniques that are well known in the art. In one embodiment, an indium-tin oxide is used for diode contacts 845 and 846. Indium-tin is an oxide that is a conducting material transparent to light passing to the n-type regions. In another embodiment, the diode contact is a metal, for example, gold or aluminum.

An insulating oxide 850 is deposited on top of semiconductor material 810. Metal contacts 855 and 860 are then applied to photodiodes 875 and 876. Metal contacts 855 and 860 are plated such that the contact thickness 861 is equal to or greater than the minimum contact width required for bonding. For one embodiment, the minimum contact width required for bonding is. 100 microns.

Detector layer 830 is then ready to be coupled to birefringent crystal 890. The detectors are aligned with birefringent crystal 890 such that optically processed light is directed to the photodiodes. Photodiodes 875 and 876 may be physically separated to prevent electrical conduction between them. In an alternative embodiment, isolation regions are formed in semiconductor material 810 to prevent electrical conduction between photodiodes. Wires (not shown) are bonded to metal contacts 855 and 860 and to ohmic contact 825 of the detectors 875 and 876. Bonding techniques are well known in the art and, thus, the details are not described herein.

Figure 9:
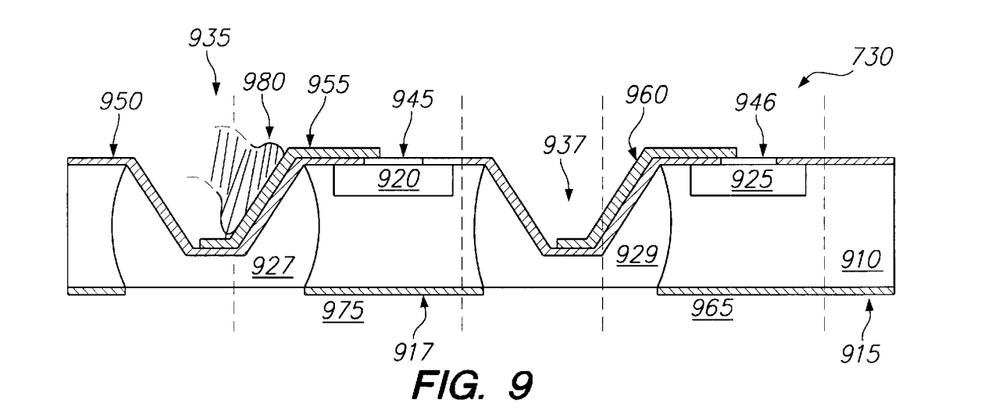
FIG. 9 illustrates a cross section of a detector layer according to an alternative embodiment of the present invention.

FIG. 9 illustrates a cross section of two detectors in the detector layer according to an alternative embodiment of the present invention. P-type ohmic contacts 917 and 915 are placed on one side of p-type semiconductor material 910. Isolation regions 927 and 929 are created in semiconductor material 910 to prevent electrical conduction between photodiode detectors 975 and 965. The detectors 975 and 965 are created by removing semiconductor material 910 to form tubs 935 and 937, respectively, having sidewalls. In one embodiment, the tubs are anisotropically etched to have sidewalls with an angle of approximately 54.7 degrees. N-type regions 920 and 925 are created in semiconductor material 910 adjacent to tubs 935 and 937, respectively. In an alternative embodiment, an n-type semiconductor is used for material 910 with p-type doping for regions 920 and 925.

Diode contacts 945 and 946 are placed on top of regions 920 and 925, respectively, using photolithography techniques that are well known in the art. In one embodiment, an indium-tin oxide is used for diode contacts 945 and 946. An insulating oxide 950 is deposited on top of semiconductor material 910 in areas not covered by the diode contact.

Metal contacts 955 and 960 are then applied to cover the sidewalls of tubs 935 and 937, and to extend to the diode oxide of detectors 975 and 965. The detectors are aligned with a birefringent crystal (not shown) such that optically processed light is directed to the detector photodiodes. In one embodiment, the detector layer wafer is coupled to the birefringent-carrier crystalline wafer and then the combined wafers are cut to produce several optics modules that can each be mounted on a head. Wire 980 may then be bonded to metal contact 955. Wires (not shown) are also bonded to metal contact 960 and to ohmic contacts 917 and 915. Using the etched sidewalls for bonding in the detector layer eliminates the need for a thick contact plating.

In an alternative embodiment, the detectors may be physically separated by cutting the detector layer along the bottom of the tubs either before or after attachment to the birefringent crystal. If the detectors are physically separated then there is no longer a need to create separate ohmic contacts 917 and 915 to semiconductor material 910 or to create isolation regions 927 and 929. In an alternative embodiment, the detectors are flip chip bonded through solder bumps to leads on the birefringent crystal having conductive vias. In yet another embodiment, individual chips are bonded to a lead frame that is bonded to the birefringent crystal.

It should be noted that a particular order of coupling the detector wafer, the birefringent crystal wafer, and the carrier crystal wafer is not required. In one embodiment, the wafers are coupled with an ultra-violet curable glue. The coupled wafers may then be cut into bars. The angle of the saw cuts define the angle of incident light on the input side and the output side of the resulting optics modules. A bar is polished and then AR coatings are applied to the input and output sides. The bar is then cut into individual optics modules with the location of the cut defining the length of an optics module.

By using wafer processing to manufacture optics modules, the cost of each optics module may be reduced and the optical coatings may be more precisely aligned. Furthermore, the use of a wafer level optics module allows for optical signal processing on the head while reducing head weight by eliminating the multiple optical fibers and the discrete optical components of previous on-head optical processing systems. Furthermore, the use of the optics module on a head reduces noise associated with optical fiber transmission to off-head optical processing components.

In an alternative embodiment, however, the optics module is manufactured using discrete components, rather than wafers, for the carrier and birefringent crystals. The crystal components are then segment coated with the optical materials and coupled together as described above.

It should also be noted that the optics module is not limited to use only in systems that perform optical processing on the head but may also be used in systems where the optical processing components are located remotely from the head, for example, on an the actuator arm of a storage system.

Figure 10:
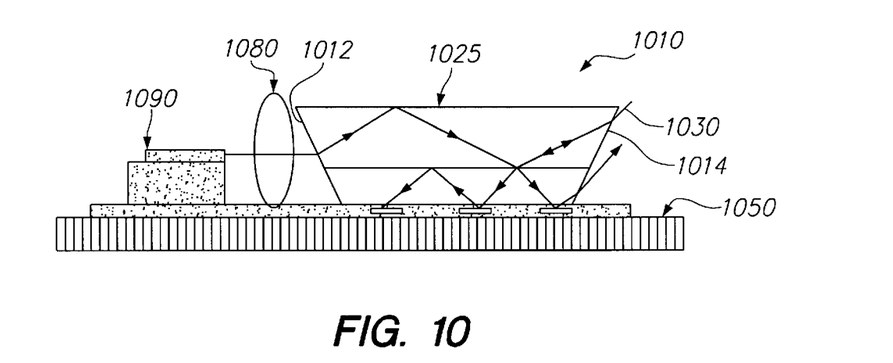
FIG. 10 illustrates an alternative embodiment where the optics module is integrated into a microbench assembly.

FIG. 10 illustrates an alternative embodiment where the optics module is integrated into a microbench assembly located remotely from a head. Microbench assembly 1010 includes an optics module 1025 placed on a thermoelectrically cooled silicon detection wafer 1050 along with a laser diode 1090 and a collimating lens 1080. An optical fiber (not shown) is used to carry light beam 1030 to a head and a reflected beam from the head (not shown). Input side 1012 and output side 1014 are cut for beam shaping as previously discussed above.

The optics module described in the above embodiments replaces discrete optical components with segmented optical coatings and the use of particular angles of incidence for light entering the optics module. By using an optics module rather than numerous discrete components, head complexity, size, and manufacturing cost may be reduced.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A detector for use in an optics module, comprising:
   a diode formed in a substrate and having a top surface and a sloped sidewall;
   a conducting transparent material coupled to at least a portion of the top surface of the diode;
   an insulating material coupled to at least a portion of the diode, the insulating material disposed on at least a portion of the sloped sidewall and extending to the conducting transparent material; and
   a metal disposed on at least a portion of the insulating material and at least a portion of the conducting material, wherein the metal is coupled to the conducting transparent material and the metal forms a contact bonding location on at least a portion of the sloped sidewall.

2. The detector of claim 1, wherein the metal has a thickness less than 100 microns.

3. The detector of claim 1, further comprising a wire bonded to at least a portion of the contact bonding location.

4. The detector of claim 1, further comprising an isolation region formed in the substrate adjacent to the sloped sidewall.

5. The detector of claim 1, further comprising an ohmic contact disposed on at least a portion of a surface of the diode not coupled to the conducting material.

6. The detector of claim 1, wherein the substrate is comprised of a semiconductor material.

7. The detector of claim 1, wherein the conducting material is comprised of an indium-tin oxide.

8. The detector of claim 1, wherein the insulating material is comprised of an insulating oxide.

9. A detector layer, comprising:
   a plurality of diodes formed in a substrate, each of the plurality of diodes having a top surface and a sloped sidewall;
   an isolation region between each of the plurality of diodes;
   a plurality of conducting transparent materials, one of the plurality of conducting transparent materials coupled to at least a portion of the top surface of one of the plurality of diodes;
   an insulating material between each of the plurality of conducting transparent materials disposed on at least a portion of the sloped sidewall of each of the plurality of diodes; and
   a plurality of metal contacts disposed on at least a portion of the insulating material and at least a portion of the top surface of the plurality of conducting materials, one of the plurality of metal contacts coupled to one of the plurality of conducting transparent materials.

10. The detector layer of claim 9, further comprising a plurality of ohmic contacts, one of the plurality of ohmic contacts coupled to at least a portion of a surface of a diode not coupled to the conducting material.

11. The detector layer of claim 9, wherein the substrate is comprised of a semiconductor material.

12. The detector layer of claim 9, wherein the plurality of conducting materials are comprised of an indium-tin oxide.

13. The detector layer of claim 9, wherein the insulating material is comprised of an insulating oxide.

14. A method of bonding to an optics module, comprising:

generating a detector having a top surface and a sloped sidewall, wherein a metal overlies at least a portion of the sloped sidewall to form a contact bonding location;

coupling the top surface of the detector to the optics module; and bonding a wire to at least a portion of the contact bonding location on the sloped sidewall of the detector.

15. The method of claim 14, wherein the detector has the metal on the top surface, wherein the metal has a thickness and the sloped sidewall has a dimension, and wherein the thickness of the metal is less than the dimension of the sidewall.

* * * * *